(12) United States Patent
Brillon (10) Patent No.: US 12,313,007 B2
(45) Date of Patent: May 27, 2025

(54) AIRCRAFT POWERPLANT ROTATING ASSEMBLY WITH SACRIFICIAL ANODE(S)

(71) Applicant: Pratt & Whitney Canada Corp., Longueuil (CA)

(72) Inventor: Louis Brillon, Varennes (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 18/202,765

(22) Filed: May 26, 2023

(65) Prior Publication Data
US 2024/0392727 A1    Nov. 28, 2024

(51) Int. Cl.
*F02C 7/30*     (2006.01)
*G01N 17/00*    (2006.01)
*B64D 45/00*    (2006.01)

(52) U.S. Cl.
CPC ............. *F02C 7/30* (2013.01); *G01N 17/006* (2013.01); *B64D 2045/0085* (2013.01); *F05D 2240/61* (2013.01); *F05D 2260/80* (2013.01); *F05D 2260/95* (2013.01)

(58) Field of Classification Search
None
See application file for complete search history.

(56) References Cited

U.S. PATENT DOCUMENTS

| | | | |
|---|---|---|---|
| 2012/0189425 A1* | 7/2012 | Moors | F04D 29/023 415/118 |
| 2016/0153287 A1* | 6/2016 | Roach | F04D 29/542 464/181 |
| 2016/0208813 A1 | 7/2016 | Zafiris | |
| 2018/0058221 A1 | 3/2018 | Kupratis | |
| 2018/0202299 A1 | 7/2018 | Murdock | |
| 2022/0410208 A1* | 12/2022 | Grunenwald | C23C 24/08 |
| 2023/0047822 A1 | 2/2023 | Yasutomo | |

FOREIGN PATENT DOCUMENTS

JP    03530236 B2    5/1996

OTHER PUBLICATIONS

EP Search Report for EP Patent Application No. 24178010.5 dated Oct. 16, 2024.

* cited by examiner

*Primary Examiner* — Katheryn A Malatek
(74) *Attorney, Agent, or Firm* — Getz Balich LLC (57) ABSTRACT

A powerplant is provided for an aircraft. This aircraft powerplant includes an aircraft engine, and the aircraft ending includes a shaft and an anode. The shaft is configured to rotate about an axis. The shaft is configured from or otherwise includes a shaft material with a first anodic potential. The anode is mounted to and electrically coupled with the shaft. The anode is configured from or otherwise includes an anode material with a second anodic potential that is greater than the first anodic potential.

15 Claims, 7 Drawing Sheets

AIRCRAFT POWERPLANT ROTATING ASSEMBLY WITH SACRIFICIAL ANODE(S)

TECHNICAL FIELD

This disclosure relates generally to an aircraft powerplant and, more particularly, to a rotating assembly for the aircraft powerplant.

BACKGROUND INFORMATION

An aircraft powerplant such as a gas turbine engine includes one or more rotating assemblies. These rotating assemblies may be subject to corrosion under certain environmental conditions. Various techniques and coatings are known in the art for reducing corrosion of components of the rotating assemblies. While these known techniques and coatings have various advantages, there is still room in the art for improvement.

SUMMARY

According to an aspect of the present disclosure, a powerplant is provided for an aircraft. This aircraft powerplant includes an aircraft engine, and the aircraft ending includes a shaft and an anode. The shaft is configured to rotate about an axis. The shaft is configured from or otherwise includes a shaft material with a first anodic potential. The anode is mounted to and electrically coupled with the shaft. The anode is configured from or otherwise includes an anode material with a second anodic potential that is greater than the first anodic potential.

According to another aspect of the present disclosure, another powerplant is provided for an aircraft. This aircraft powerplant includes a shaft and an anode. The shaft is configured to rotate about an axis. The shaft is configured from or otherwise includes a first metal with a first anodic potential. The anode is disposed within a bore of the shaft. The anode is mounted to and in electrical contact with the shaft. The anode is configured from or otherwise includes a second metal with a second anodic potential that is greater than the first anodic potential.

According to still another aspect of the present disclosure, another powerplant is provided for an aircraft. This aircraft powerplant includes a shaft and an anode. The shaft is configured to rotate about an axis. The shaft is configured from or otherwise includes a first metal with a first anodic potential. The anode has a full-hoop body that extends circumferentially around the axis. The anode is mounted to and in electrical contact with the shaft. The anode is configured from or otherwise includes a second metal with a second anodic potential that is greater than the first anodic potential.

The anode may be configured as a balancing cup for the shaft.

The powerplant may also include an aircraft engine that includes an engine housing.

The shaft may be housed within the engine housing.

The anode material of the anode may contact the shaft material of the shaft.

The anode may be disposed within a bore of the shaft.

The anode may be radially outboard of the shaft.

The anode may have a full-hoop body extending circumferentially around the axis.

The anode may be rotationally imbalanced about the axis.

The anode may be rotationally balanced about the axis.

The anode may be configured as a rotational balancing weight.

The anode may be configured as or otherwise include a sleeve mounted onto the shaft.

The anode may be one of a plurality of anodes mounted to and electrically coupled with the shaft. The anodes may be arranged circumferentially about the axis in an array. Each of the anodes may be configured from or otherwise include the anode material.

The array of the anodes may be rotationally balanced about the axis.

The shaft may have an axial shaft length along the axis. The anode may be located along an intermediate two-thirds of the axial shaft length.

The anode may be located at an axial end of the shaft.

The powerplant may include a sensor system configured to detect corrosion of the anode.

The aircraft engine may be configured as or otherwise include a gas turbine engine. The powerplant may include a bladed rotor coupled to and rotatable with the shaft.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
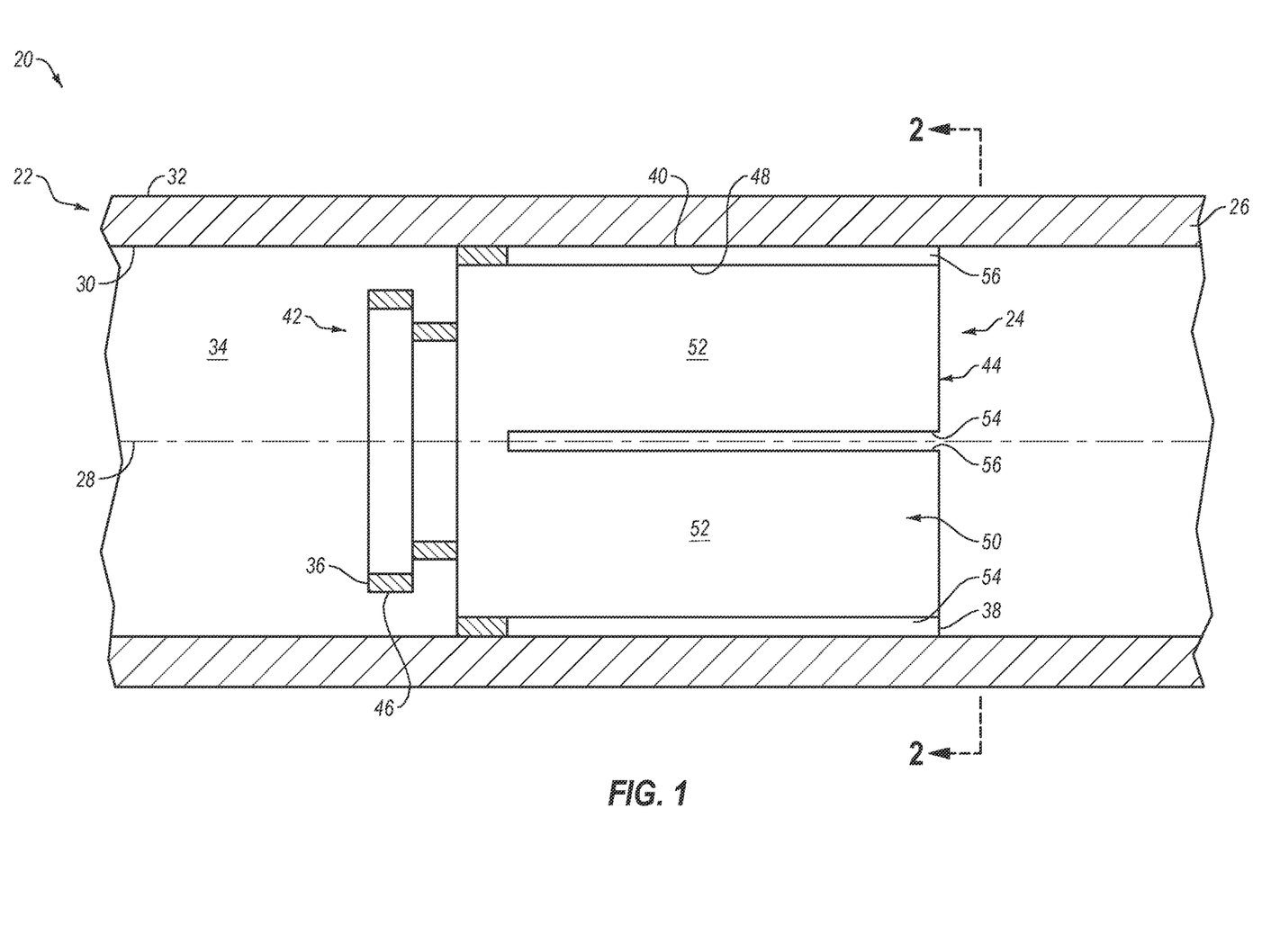
FIG. 1 is a partial side sectional illustration of a rotating assembly.

FIG. 1 illustrates a portion of a rotating assembly 20 for a powerplant of an aircraft. The aircraft may be an airplane, a drone (e.g., an unmanned aerial vehicle (UAV)) or any other manned or unmanned aerial vehicle. The aircraft powerplant may be configured as, or otherwise included as part of, a propulsion system for the aircraft. The aircraft powerplant may also or alternatively be configured as, or otherwise included as part of, an electric power system for the aircraft. The rotating assembly 20 of FIG. 1 includes a shaft 22 and an anode 24.

The shaft 22 of FIG. 1 includes a shaft sidewall 26. The shaft 22 and its shaft sidewall 26 extend axially along an axis 28, which axis 28 may be a centerline axis and/or a rotational axis of the rotating assembly 20 and its members 22 and 24. The shaft 22 and its shaft sidewall 26 extend radially from a radial inner side 30 of the shaft 22 and its shaft sidewall 26 to a radial outer side 32 of the shaft 22 and its shaft sidewall 26. The shaft 22 and its shaft sidewall 26 extend circumferentially about (e.g., completely around) the axis 28. The shaft 22 and its shaft sidewall 26 may thereby have a full-hoop (e.g., tubular) body. With this arrangement, the shaft 22 includes an internal shaft bore 34 formed by the shaft sidewall 26 at the shaft inner side 30. This shaft bore 34 may extend axially into or through the shaft 22.

The shaft 22 and its shaft sidewall 26 of FIG. 1 are constructed from or otherwise include a shaft material. This shaft material is a metal with a first anodic potential. The term "anodic potential" may describe a property (e.g., an electrode potential) of a material to operate as an anode and oxide when exposed to a fluid such as humid air. The shaft material may be a pure metal or a metal alloy. Examples of the shaft material include, but are not limited to, chromium-molybdenum and chromium-nickel-molybdenum alloy steels.

The anode 24 extends axially along the axis 28 between and to a first end 36 of the anode 24 and a second end 38 of the anode 24. The anode 24 extends radially outward (e.g., radially away from the axis 28) to a radial outer side 40 of the anode 24. The anode 24 extends circumferentially about (e.g., completely around) the axis 28. The anode 24 may thereby have a full-hoop body. The anode 24 of FIG. 1 includes an anode base 42 and an anode sidewall 44.

The anode base 42 is disposed at (e.g., on, adjacent or proximate) the anode first end 36. This anode base 42 may include a grip 46 configured for use during assembly of the anode 24 with the rotating assembly 20 and its shaft 22 and/or disassembly of the anode 24 from the rotating assembly 20 and its shaft 22. The grip 46, for example, may be configured as or otherwise include an annular flanged rim, one or more tabs, or any other feature which may be gripped by and/or otherwise engaged by an anode assembly and/or disassembly tool.

The anode sidewall 44 is connected to (e.g., formed integral with) the anode base 42. This anode sidewall 44 projects axially out from the anode base 42 along the axis 28 to the anode second end 38. The anode sidewall 44 extends radially from a radial inner side 48 of the anode sidewall 44 to the anode outer side 40. With this arrangement, the anode 24 includes an internal anode bore 50 formed by the anode sidewall 44 at the sidewall inner side 48. This anode bore 50 may extend axially into the anode 24 from the anode second end 38 to the anode base 42.

Figure 2:
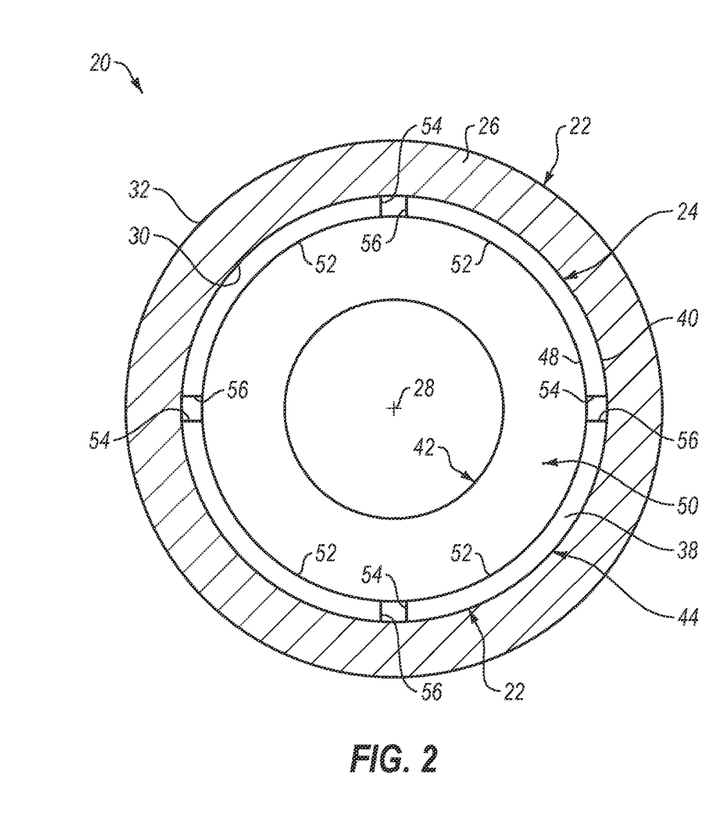
FIG. 2 is a cross-sectional illustration of the rotating assembly taken along line 2-2 in FIG. 1.

The anode sidewall 44 of FIG. 1 is divided into a plurality circumferential anode segments 52; e.g., arcuate tabs. These anode segments 52 are arranged circumferentially about the axis 28 in an array; e.g., a circular array. Each of these anode segments 52 projects axially (e.g., out from the anode base 42 to the anode second end 38. Referring to FIG. 2, each of the anode segments 52 extends circumferentially about the axis 28 between opposing circumferential sides 54 and 56 of the respective anode segment 52. Each circumferentially neighboring (e.g., adjacent) pair of the anode segments 52 may be laterally circumferentially separated by a respective gap; e.g., a slot, a channel, etc. Each gap projects axially into the anode 24 and its anode sidewall 44 from the anode second end 38 towards the anode base 42. Each gap extends radially through the anode sidewall 44 between the sidewall inner side 48 and the anode outer side 40. Each gap extends circumferentially between the respective pair of the anode segments 52 and their respective sides 54 and 56.

With the foregoing arrangement, the anode 24 may be configured as a rotational balancing weigh; e.g., a balancing mass, a balancing cup, etc. The anode 24, for example, may be rotationally imbalanced (e.g., asymmetrically balanced) about the axis 28. For example, referring to FIG. 3, a section of one or more of the anode segments 52 may be removed (see dashed lines) (e.g., trimmed, cutoff, etc.) based on a balancing correction for the shaft 22. This removal may be performed such that, when the anode 24 is assembled with the shaft 22 of FIGS. 1 and 2, the imbalanced weight distribution of the anode 24 aligns a center of gravity of a combination of the shaft 22 and the anode 24 (or alternatively the entire rotating assembly 20) with the axis 28. Thus, when the anode 24 is assembled with the shaft 22 of FIGS. 1 and 2, the combination of the shaft 22 and the anode 24 (or alternatively the entire rotating assembly 20) is rotationally balanced about the axis 28.

The anode 24 and its anode sidewall 44 of FIG. 1 are constructed from or otherwise include an anode material. This anode material is a metal with a second anodic potential. The anode material may be a pure metal or a metal alloy. The anode material is selected such that its second anodic potential is greater than the first anodic potential of the shaft material. Examples of the anode material include, but are not limited to, cast or wrought magnesium & magnesium-base alloys; wrought zinc; zinc-base die-casting alloys; zinc plated/hot-dip-zinc plate; galvanized steel/aluminum; cast alloys (e.g., other than silicon type); cadmium; plated and chromate/aluminum; wrought alloys (e.g., other than 2000 Series aluminum cast alloys of the silicon type/iron); wrought, gray or malleable, plain carbon and low alloy steels/aluminum; solid or plated wrought alloys of the 2000 Series/lead; high lead alloys/tin-plate; and tin-lead solder.

To assemble the anode 24 with the shaft 22, the anode 24 of FIGS. 1 and 2 is disposed within the shaft bore 34. The anode 24 is also mounted to the shaft 22 and its shaft sidewall 26. The anode 24 and its anode sidewall 44, for example, may be press fit into (or otherwise mechanically attached to and/or bonded to) the shaft 22 and its shaft sidewall 26. The anode 24 and its anode sidewall 44 may thereby be electrically coupled with (e.g., in direct electrical contact with) the shaft 22 and its shaft sidewall 26. More particularly, the anode material of the anode 24 is electrically coupled with (e.g., in direct electrical contact with) the shaft material of the shaft 22. Since the anode material has a greater anodic potential than the shaft material, the anode 24 and the shaft 22 may collectively form an electric circuit path where the anode 24 operates as an anode electrode (a positive electrode) and the shaft 22 operates as a cathode electrode (a negative electrode) when in contact with a fluid such as humid air. Thus, when an electric current flows across the rotating assembly 20, this electric current may flow from the anode 24 to the shaft 22 and thereby reduce a propensity for the shaft 22 to corrode when exposed to the fluid. By contrast, the electric current may increase a propensity for the anode 24 to corrode. The anode 24 may thereby be configured as a sacrificial member of the rotating assembly 20. The configuration, functionality and/or location of the anode 24 may thereby be selected to facilitate relatively easy (and less expensive) replacement of the anode 24 as compared, for example, to replacement of the shaft if the shaft was to corrode (e.g., if configured without the anode 24).

Figure 4:
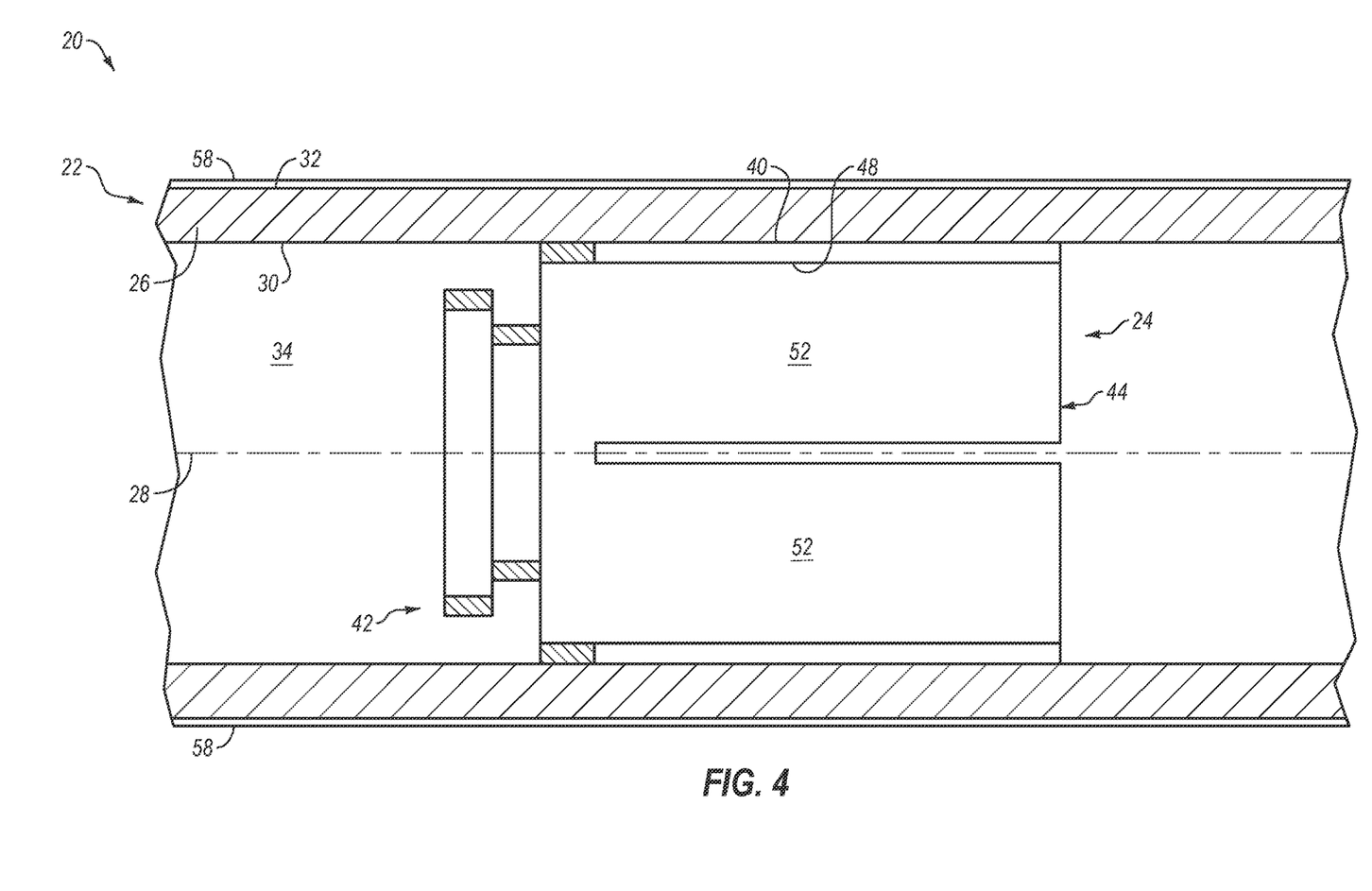
FIG. 4 is a partial side sectional illustration of the rotating assembly with a coating applied to a shaft.

In some embodiments, referring to FIG. 4, the shaft 22 may include a corrosion resistant coating 58. While this coating 58 may protect certain (e.g., exterior, outer) regions of the shaft 22 from corrosion, such a coating may be difficult to apply within the shaft bore 34 or other areas without a direct line of sight. However, since the anode 24 of FIG. 1 is disposed within the shaft bore 34, the anode 24 may reduce or prevent corrosion of the shaft 22 and its shaft sidewall 26 at the shaft inner side 30. The anode 24 may also provide corrosion protection for various other uncoated areas along the shaft 22 which are not covered with the coating 58, which uncoated areas may be radially inside and/or outside of the shaft 22. Examples of the uncoated areas include, but are not limited to, exterior or interior shaft splines, a (e.g., cylindrical) land surface for receiving a bearing, a (e.g., cylindrical) land surface for receiving a seal element, or any other feature or surface of the shaft 22 which meets another rotating assembly element at a tight or interference fit. Of course, it is also contemplated the shaft 22 may be configured without any corrosion resistant coating where the anode 24 can provide sufficient corrosion protection.

Figure 3:
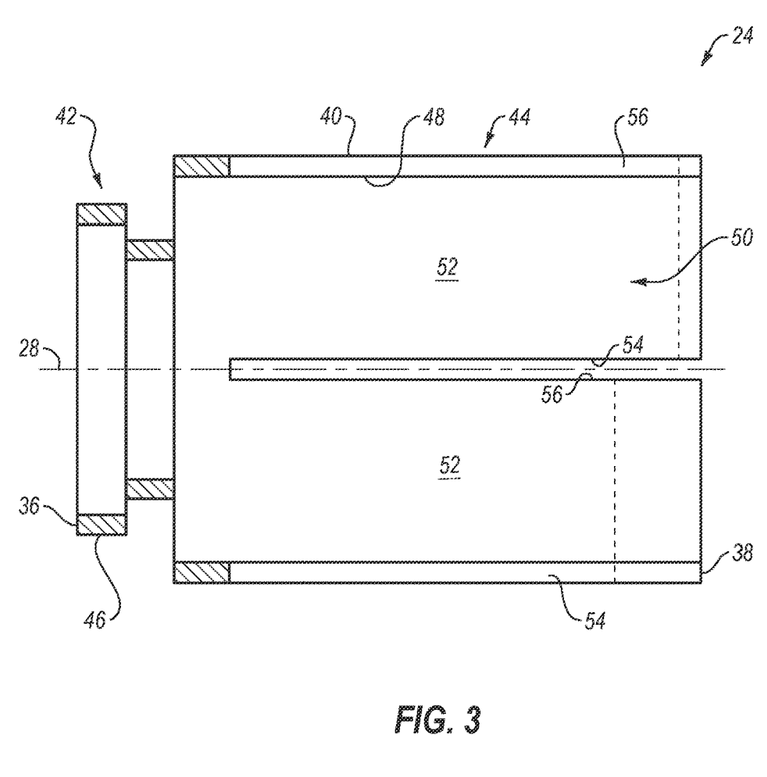
FIG. 3 is a side sectional illustration of an anode for the rotating assembly configured as a rotational balancing weight.
Figure 5:
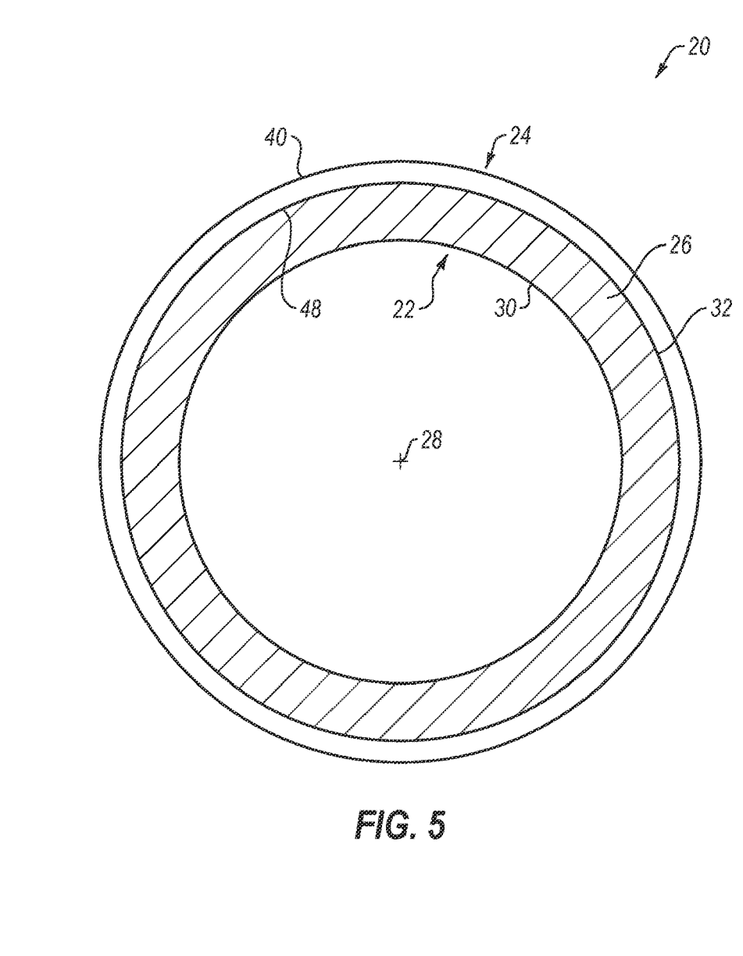
FIG. 5 is a cross-sectional illustration of the rotating assembly with the anode mounted onto the shaft, where the anode of FIG. 5 has a full-hoop geometry.
Figure 6:
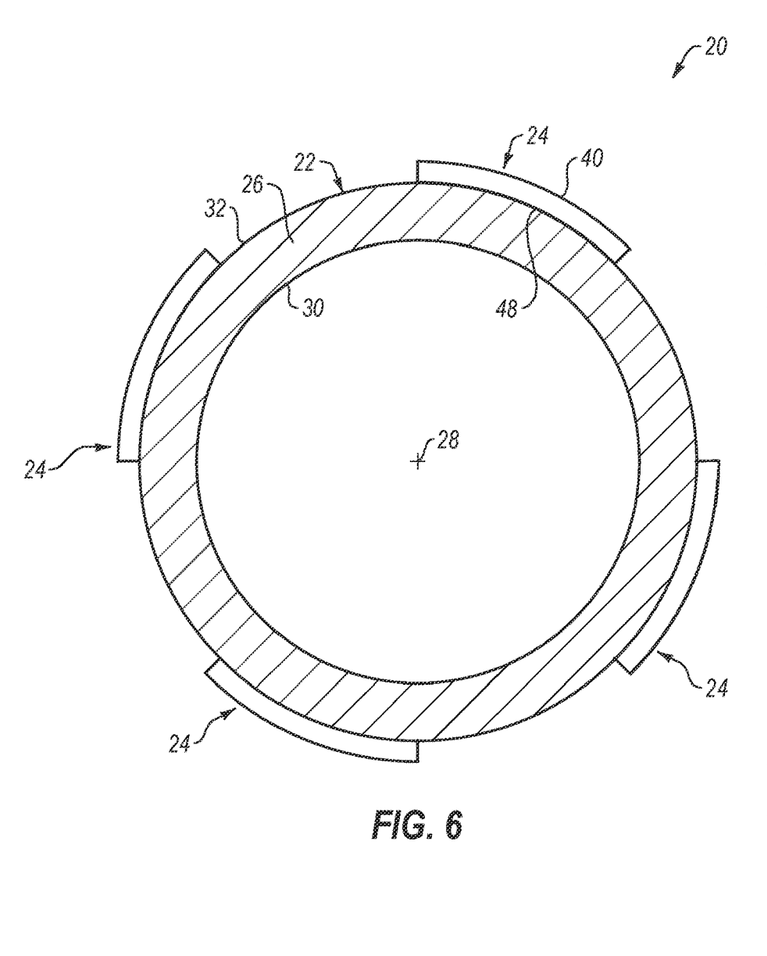
FIG. 6 is a cross-sectional illustration of the rotating assembly with a plurality of the anodes mounted onto the shaft, where each anode of FIG. 6 has an arcuate geometry.

While the anode 24 of FIGS. 1-3 is described as including the anode members 42 and 44, the anode 24 of the present disclosure is not limited to such an exemplary rotational balancing weight configuration. Moreover, the anode 24 is not limited to rotational balancing weight applications. The anode 24, for example, may alternatively be configured as another engine component or a dedicated sacrificial anodic part. For example, referring to FIG. 5, the anode 24 may be configured as a tubular sleeve mounted onto the shaft 22. This anode 24 is mounted to an exterior of the shaft 22. The anode 24 of FIG. 5, for example, is disposed radially outboard of, axially overlaps and circumscribes the shaft 22 and its shaft sidewall 26. The anode 24 may thereby electrically engage (e.g., contact) the shaft 22 and its shaft sidewall 26 at the shaft outer side 32. In another example, referring to FIG. 6, the anode 24 may be one of a plurality of anodes 24 mounted to the shaft 22. These anodes 24 may be arranged circumferentially about the axis 28 in an array; e.g., a circular array. Each of the anodes 24 may have an arcuate geometry which extends partially circumferentially about the axis 28. Each of the anodes 24 of FIG. 6 is disposed radially outboard of, axially overlaps and extends circumferentially about the shaft 22 and its shaft sidewall 26. Each of the anodes 24 may thereby electrically engage (e.g., contact) the shaft 22 and its shaft sidewall 26 at the shaft outer side 32. While the anode array of FIG. 6 include four (4) of the anodes 24, it is contemplated the anode array may alternatively include two (2), three (3) or five (5) or more of the anodes 24. Moreover, while the anode(s) 24 of FIGS. 5 and 6 are described as being mounted to the shaft 22 at its shaft outer side 32, it is contemplated the anode(s) 24 may alternatively be disposed within the shaft bore 34 and mount to the shaft 22 at its shaft inner side 30.

Referring to FIG. 3, where the anode 24 is configured as a rotational balancing weight, the anode 24 itself may be rotationally imbalanced about the axis 28 so as to correct for any rotational imbalance of the shaft 22 about the axis 28, for example, as described above. However, where the anode 24 is configured as another engine component or a dedicated sacrificial anodic part, the anode 24 (or the array of anodes 24) may be rotationally balanced about the axis 28. The anode 24 of FIG. 5, for example, may itself be rotationally balanced about the axis 28. Similarly, the array of the anodes 24 of FIG. 6 may collectively be rotationally balanced about the axis 28. Such embodiments may be implemented where, for example, the shaft 22 is already rotationally balanced by itself or using a discrete rotational balancing weight or weights.

Figure 7A:
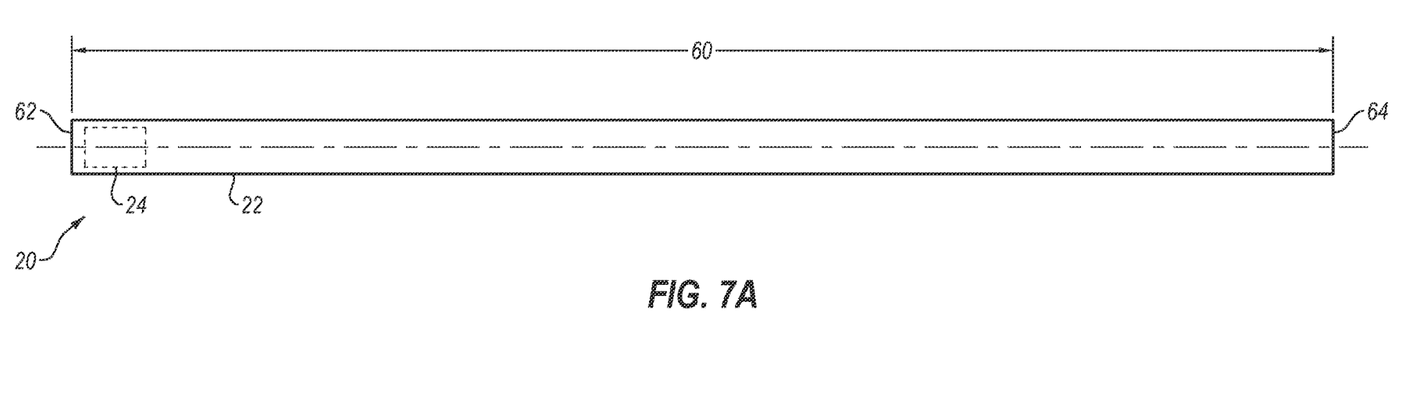
FIGS. 7A and 7B are schematic illustrations of the rotating assembly with the anode arranged at various positions along an axial length of the shaft.
Figure 7B:
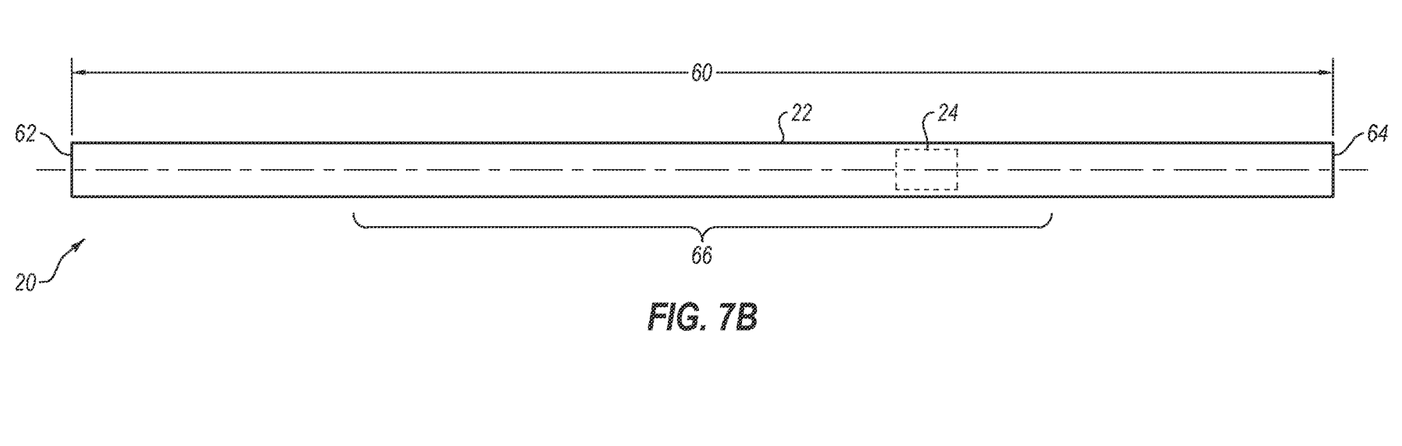

Referring to FIGS. 7A and 7B, the anode(s) 24 may be arranged at various locations along the shaft 22. The shaft 22 of FIGS. 7A and 7B, for example, has an axial shaft length 60 that extends axially along the axis 28 from a first end 62 of the shaft 22 and a second end 64 of the shaft 22. Referring to FIG. 7A, the anode(s) 24 may be disposed at (or about) the shaft first end 62 (or the shaft second end 64). By locating the anode(s) 24 at the shaft first end 62 (or the shaft second end 64), it may be easier to (e.g., visually) inspect a condition of the anode(s) 24. Alternatively, referring to FIG. 7B, the anode(s) 24 may be disposed along an axial intermediate section 66 of the shaft 22 and its shaft length 60, which intermediate section 66 of FIG. 7B is axially centered between the shaft ends 62 and 64. This intermediate section 66 may be an intermediate two-thirds (⅔), one-half (½), one-third (⅓) or one-quarter (¼) of the shaft length 60. The anode(s) 24 may thereby be located deep within the aircraft powerplant. Although inspection of the anode(s) 24 may be more difficult, the anode(s) 24 may be placed closer to areas of the shaft 22 which may need additional corrosion protection and/or which are more difficult to protect with a coating, etc.

Figure 8:
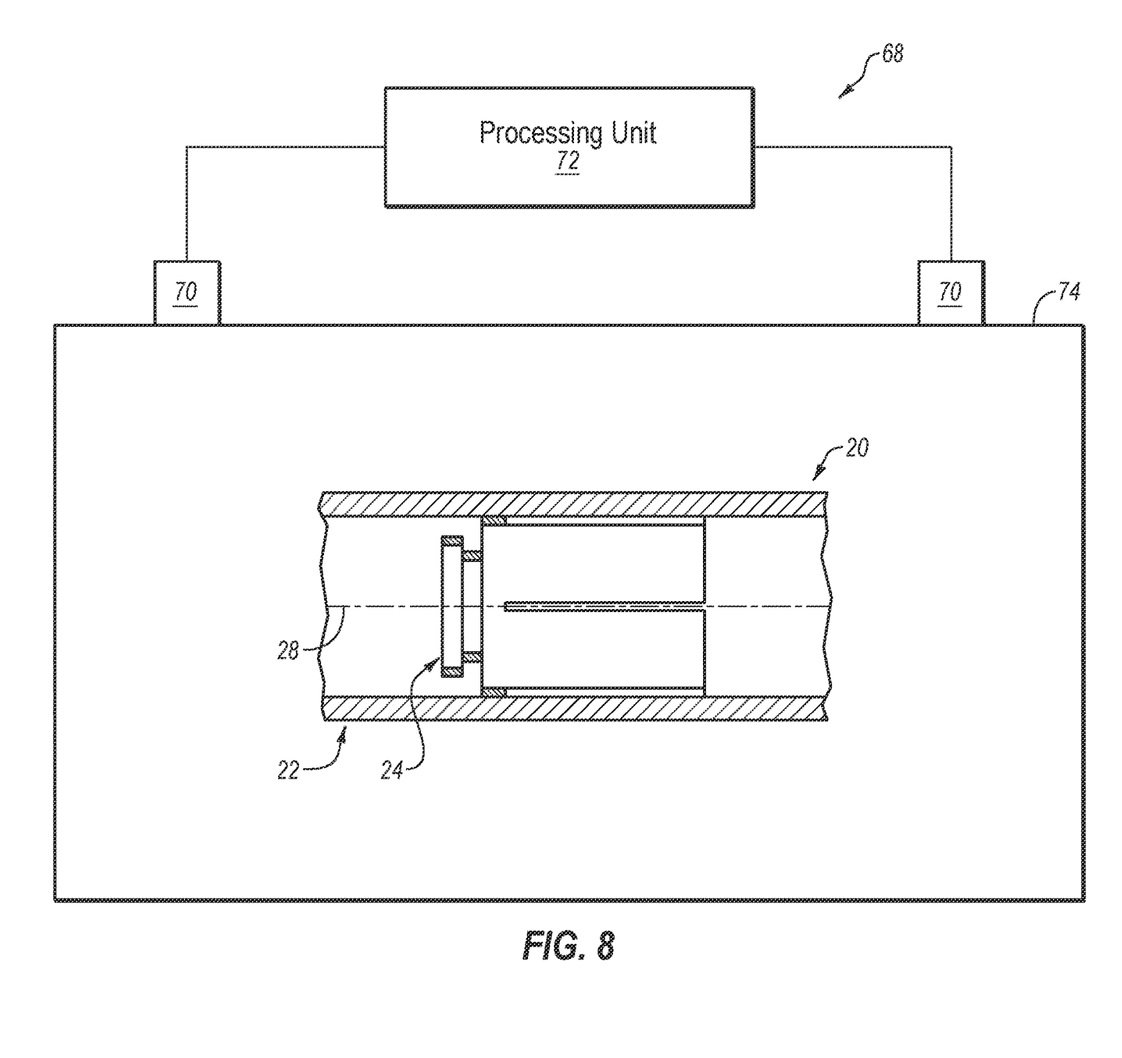
FIG. 8 is a schematic illustration of the rotating assembly with an engine case and a sensor system.

Referring to FIG. 8, the aircraft powerplant may include a sensor system 68. This sensor system 68 includes one or more sensors 70 and a processing unit 72 in signal communication with (e.g., hardwired to and/or wirelessly coupled with) the sensors 70. Each sensor 70 may be configured as a vibration sensor. With this arrangement, the sensor system 68 may monitor powerplant vibrations; e.g., vibrations in an engine case 74 housing at least a portion or an entirety of the rotating assembly 20. By monitoring the powerplant vibrations, the sensor system 68 may determine a condition of the anode(s) 24. For example, corrosion of the anode(s) 24 may change a rotational balance of the now corroded anode(s) 24. This change in the rotational balance may affect a rotational balance of the shaft 22 and, more generally, the rotating assembly 20. As the rotating assembly 20 and its shaft 22 changes and becomes more imbalanced about the axis 28, powerplant vibrations may increase. The sensor system 68 may therefore detect corrosion of the anode(s) 24 where the monitored vibrations are equal to or exceed a threshold and/or where the monitored vibrations have a certain signature. Upon detection of such anode corrosion/rotational imbalance, the sensor system 68 may provide an alert to a powerplant operator (e.g., a pilot) or powerplant maintenance personnel. Corrosion may thereby be detected and addressed without requiring, for example, a visual inspection of the corroded part—the anode(s) 24—for initial detection.

Figure 9:
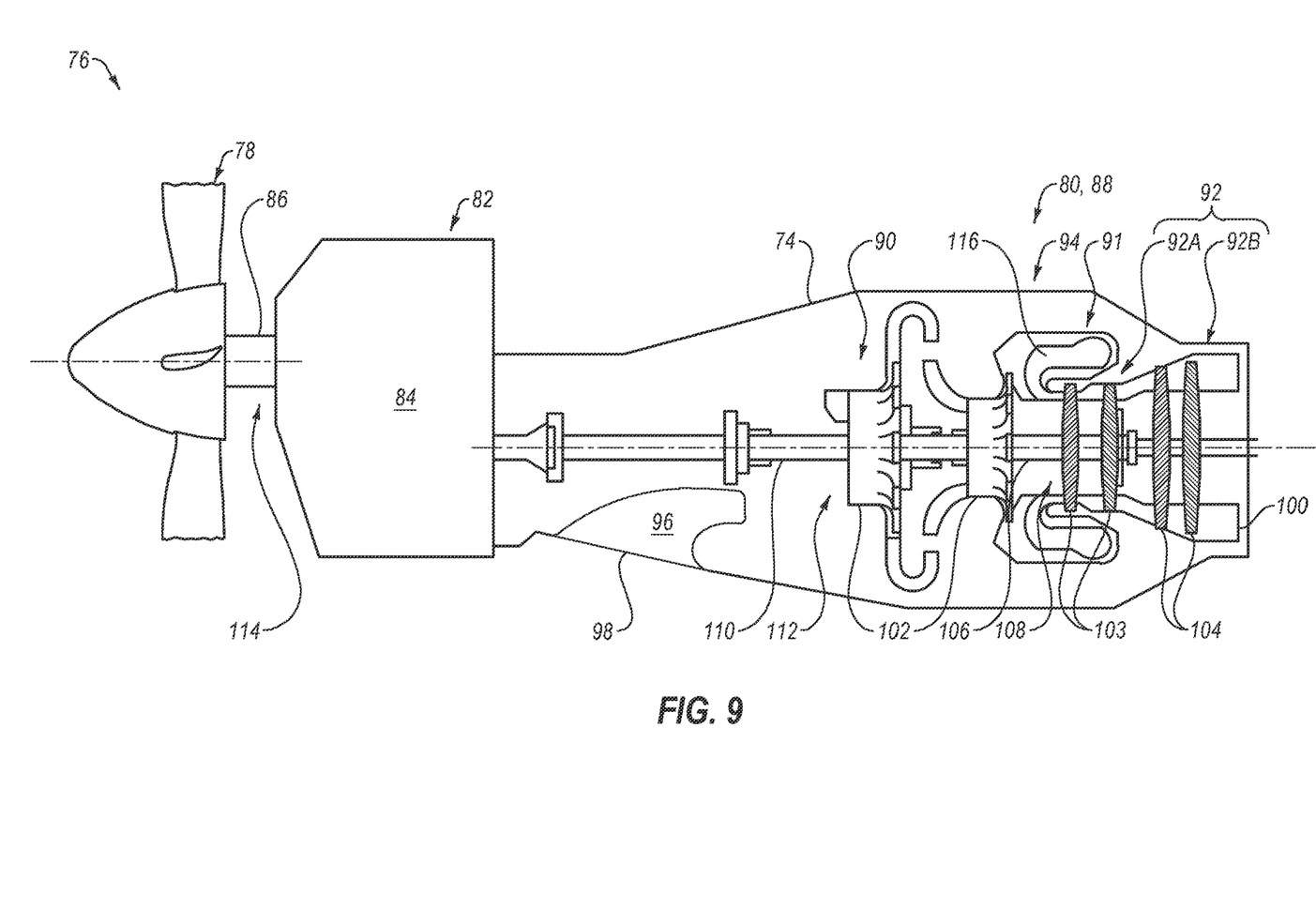
FIG. 9 is a schematic side sectional illustration of an aircraft powerplant which may include the rotating assembly.

FIG. 9 illustrates an example of the aircraft powerplant as an aircraft propulsion system 76. This aircraft propulsion system 76 includes a propulsor rotor 78 and an aircraft engine 80 configured to drive rotation of the propulsor rotor 78. The aircraft propulsion system 76 of FIG. 9, for example, also includes a powerplant drivetrain 82 operatively coupling the aircraft engine 80 to the propulsor rotor 78. This drivetrain 82 of FIG. 9 includes a geartrain 84 (e.g., a transmission, a reduction gear system, etc.) and a propulsor shaft 86 and/or another power transmission device coupling an output of the geartrain 84 to the propulsor rotor 78. The present disclosure, however, is not limited to such an exemplary geared drivetrain arrangement. In other embodiments, for example, the geartrain 84 may be omitted from the drivetrain 82 to provide a direct drive drivetrain between the aircraft engine 80 and the propulsor rotor 78.

The propulsor rotor 78 may be configured as or otherwise include a bladed rotor, or any other type of air mover. This propulsor rotor 78 may be an open rotor (e.g., an un-ducted rotor) such as a propeller rotor for a propeller propulsion system; e.g., a turboprop engine. Other examples of the open rotor include a propulsor rotor for a propfan propulsion system or a propulsor rotor for a pusher fan propulsion system. The present disclosure, however, is not limited to such exemplary open rotors nor to open rotor propulsion systems. The propulsor rotor 78, for example, may alternatively be a ducted rotor such as a fan rotor for a turbofan propulsion system; e.g., a turbofan engine. However, for ease of description, the propulsor rotor 78 may be described below as the propeller rotor.

The aircraft engine 80 of FIG. 9 is configured as a gas turbine engine 88. This gas turbine engine 88 includes a compressor section 90, a combustor section 91 and a turbine section 92. The turbine section 92 may include a high pressure turbine (HPT) section 92A and a low pressure turbine (LPT) section 92B; e.g., a power turbine section. The gas turbine engine 88 also includes the engine case 74 housing the engine sections 90-92B; e.g., a core 94 of the gas turbine engine 88.

The compressor section 90, the combustor section 91, the HPT section 92A and the LPT section 92B are arranged sequentially along a core flowpath 96 (e.g., an annular flowpath) within the gas turbine engine 88. This flowpath 96 extends within the gas turbine engine 88 from an upstream airflow inlet 98 into the gas turbine engine 88 and its flowpath 96 to a downstream combustion products exhaust 100 from the gas turbine engine 88 and its flowpath 96.

Each of the engine sections 90, 92A and 92B includes a respective bladed rotor 102-104. Each of these bladed rotors 102-104 includes a plurality of rotor blades arranged circumferentially around and connected to one or more respective rotor disks or hubs. The rotor blades, for example, may be formed integral with or mechanically fastened, welded, brazed and/or otherwise attached to the respective rotor disk(s) or hub(s).

The compressor rotor 102 is connected to the HPT rotor 103 through a high speed shaft 106. At least (or only) the compressor rotor 102, the HPT rotor 103 and the high speed shaft 106 may collectively form a high speed rotating assembly 108 of the gas turbine engine 88. The LPT rotor 104 is connected to a low speed shaft 110, which low speed shaft 110 may extend axially through a bore of the high speed rotating assembly 108 and its high speed shaft 106. At least (or only) the LPT rotor 104 and the low speed shaft 110 may collectively form a low speed rotating assembly 112. This low speed rotating assembly 112 may be coupled to and rotatable with the propulsor rotor 78 of FIG. 1 through the drivetrain 82 and its member(s) 84 and 86. At least (or only) the propulsor rotor 78 and the propulsor shaft 86 may collectively form a propulsor rotating assembly 114. The rotating assembly 20 of FIGS. 1, 2 and 4-8 may be configured as any one of the rotating assemblies 108, 112, 114 in FIG. 9. The shaft 22 of FIGS. 1, 2 and 4-8 may be configured as any one of the engine shafts 86, 106, 110 in FIG. 9.

During propulsion system operation, air enters the flowpath 96 through the airflow inlet 98 and is directed into the compressor section 90. The air within the flowpath 96 may be referred to as "core air". This core air is compressed by the compressor rotor 102 and directed into a combustion chamber 116 (e.g., an annular chamber) of a combustor within the combustor section 91. The fuel is injected into the combustion chamber 116 by one or more fuel injectors and mixed with the compressed air to provide a fuel-air mixture. This fuel-air mixture is ignited and combustion products thereof flow through and sequentially cause the HPT rotor 103 and the LPT rotor 104 to rotate. The rotation of the HPT rotor 103 drives rotation of the compressor rotor 102 and, thus, compression of the air received from the airflow inlet 98. The rotation of the LPT rotor 104 and, more generally, the low speed rotating assembly 112 provides mechanical power for driving (e.g., rotating) the propulsor rotating assembly 114 and its propulsor rotor 78.

The rotating assembly 20 may be included in various gas turbine engines other than the one described above. The rotating assembly 20, for example, may be included in a geared gas turbine engine where a geartrain connects one or more shafts to one or more rotors in a fan section, a compressor section and/or any other engine section. Alternatively, the rotating assembly 20 may be included in a gas turbine engine configured without a geartrain. The rotating assembly 20 may be included in a gas turbine engine configured with a single spool, with two spools (e.g., see FIG. 9), or with more than two spools. The gas turbine engine may be configured as a turbofan engine, a turbojet engine, a turboprop engine, a turboshaft engine, a propfan engine, a pusher fan engine or any other type of gas turbine engine. Alternatively, the aircraft engine 80 may be configured as another type of heat engine; e.g., a rotary engine (e.g., a Wankel engine), a reciprocating piston engine, etc. Moreover, as discussed above, the aircraft powerplant may also or alternatively be configured as an electrical power system. The propulsor rotor 78, for example, may be omitted and replaced by an electric generator rotor. The present disclosure therefore is not limited to any particular types or configurations of aircraft engines nor aircraft engine applications.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant for an aircraft, comprising:
    an aircraft engine comprising a shaft and an anode;
    the shaft configured to rotate about an axis, and the shaft comprising a shaft material with a first anodic potential; and
    the anode mounted to and electrically coupled with the shaft, and the anode comprising an anode material with a second anodic potential that is greater than the first anodic potential;
    wherein the anode is configured as a rotational balancing weight;
    wherein the anode is disposed within a bore of the shaft.

2. The powerplant of claim 1, wherein the anode material of the anode contacts the shaft material of the shaft.

3. The powerplant of claim 1, wherein the anode has a full-hoop body extending circumferentially around the axis.

4. The powerplant of claim 3, wherein the anode is rotationally imbalanced about the axis.

5. The powerplant of claim 3, wherein the anode is rotationally balanced about the axis.

6. The powerplant of claim 1, wherein the anode comprises a sleeve mounted in the shaft.

7. The powerplant of claim 1, wherein
the shaft has an axial shaft length along the axis; and
the anode is located along an intermediate two-thirds of the axial shaft length.

8. The powerplant of claim 1, wherein the anode is located at an axial end of the shaft.

9. The powerplant of claim 1, further comprising a sensor system configured to detect corrosion of the anode.

10. The powerplant of claim 1, wherein the aircraft engine comprises a gas turbine engine.

11. The powerplant of claim 1, further comprising a bladed rotor coupled to and rotatable with the shaft.

12. A powerplant for an aircraft, comprising:
an aircraft engine comprising a shaft and an anode;
the shaft configured to rotate about an axis, and the shaft comprising a shaft material with a first anodic potential; and
the anode mounted to and electrically coupled with the shaft, and the anode comprising an anode material with a second anodic potential that is greater than the first anodic potential:
wherein the anode is one of a plurality of anodes mounted to and electrically coupled with the shaft;
wherein the plurality of anodes are arranged circumferentially about the axis in an array; and
wherein each of the plurality of anodes comprises the anode material;
wherein the anode is disposed within a bore of the shaft.

13. The powerplant of claim 12, wherein the array of the plurality of anodes is rotationally balanced about the axis.

14. A powerplant for an aircraft, comprising:
a shaft configured to rotate about an axis, the shaft comprising a first metal with a first anodic potential; and
an anode disposed within a bore of the shaft, the anode mounted to and in electrical contact with the shaft, and the anode comprising a second metal with a second anodic potential that is greater than the first anodic potential;
wherein the anode is configured as a balancing cup for the shaft.

15. The powerplant of claim 14, wherein the anode comprises a full-hoop body that extends circumferentially around the axis.

* * * * *